(No Model.)

J. E. MARBLE.
COUPLING FOR FLEXIBLE STEAM PIPES.

No. 480,875. Patented Aug. 16, 1892.

WITNESSES:
S. B. Brewer
E. Savage

INVENTOR:
JAMES E. MARBLE.
BY William H. Low,
ATTORNEY

UNITED STATES PATENT OFFICE.

JAMES E. MARBLE, OF ALBANY, NEW YORK, ASSIGNOR, BY MESNE ASSIGNMENTS, OF ONE-HALF TO JOSEPH WILTSIE FULLER, OF SAME PLACE.

COUPLING FOR FLEXIBLE STEAM-PIPES.

SPECIFICATION forming part of Letters Patent No. 480,875, dated August 16, 1892.

Application filed May 11, 1892. Serial No. 432,599. (No model.)

*To all whom it may concern:*

Be it known that I, JAMES E. MARBLE, of the city and county of Albany, in the State of New York, have invented new and useful Improvements in Couplings for Flexible Steam-Pipes, of which the following is a specification.

My invention relates to improvements in couplings for connecting the steam-heating system of one railway-car with a like system of a conjoining car, so as to allow of a continuous flow of steam from one end of a train of railway-cars to the opposite end; and it consists in the peculiar construction and combination of parts herein described, and particularly pointed out in the claims.

Figure 1:
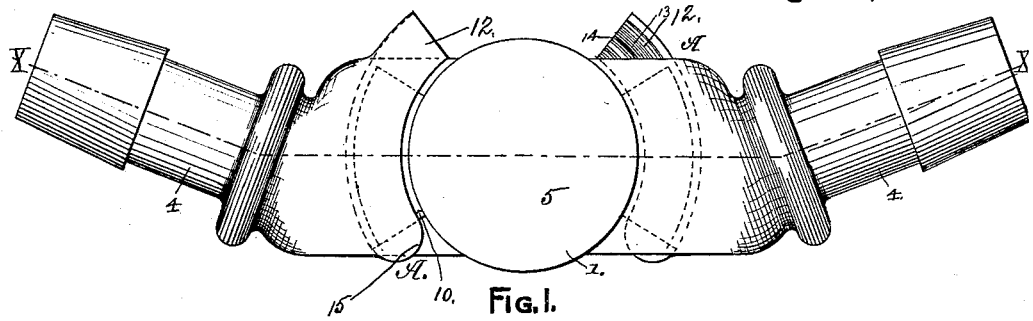
Figure 2:
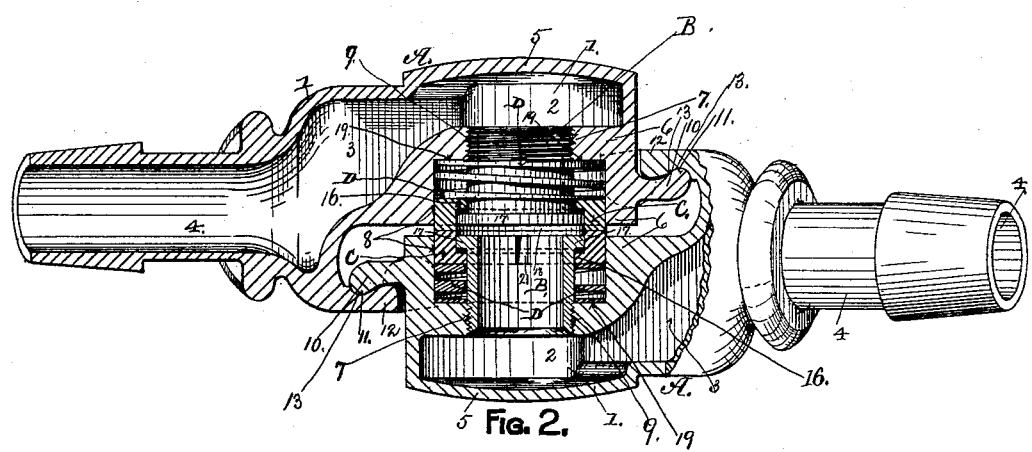
Figures 3, 5:
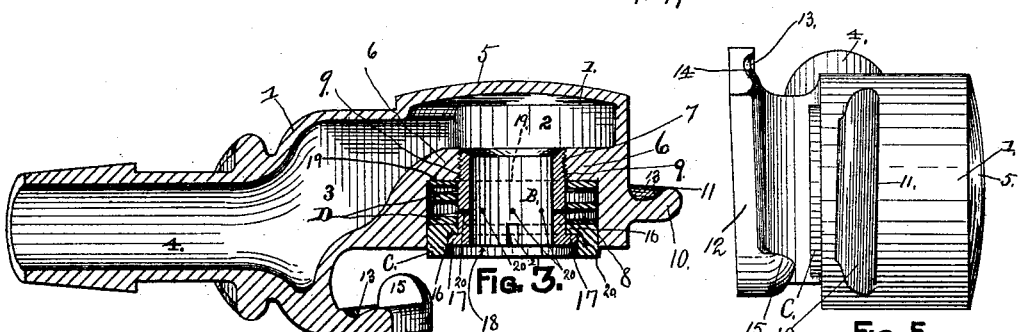
Figure 4:
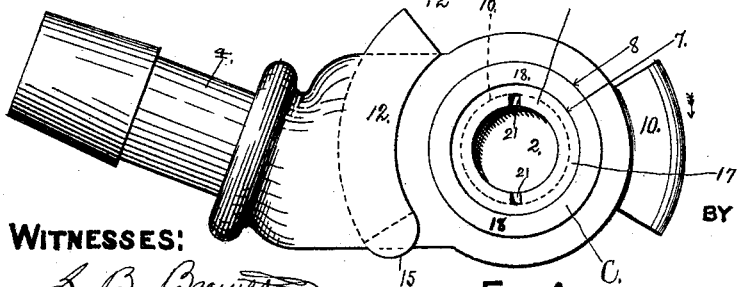

In the accompanying drawings, which are herein referred to and form part of this specification, Figure 1 is a side elevation of the two sections of my coupling joined together. Fig. 2 is longitudinal section of the same at the irregular line X X, part of one of the sections being shown in plan view; Fig. 3, a longitudinal section of one of the sections or parts of my coupling detached from the counterpart section. Fig. 4 is a side elevation of a detached section of my coupling, and Fig. 5 is an end elevation of the same.

My coupling consists of two counterpart sections fitted to join together on a longitudinal line, and each section being provided with a gasket supported by a suitable spring, the two gaskets when said sections are connected together forming a steam-tight joint.

As represented in the drawings, A designates the sections of my coupling, said sections having the same form, or substantially the same form, and each consisting of a hollow head 1, whose chamber 2 communicates with a lateral passage 3, which forms a communication between said chamber and a tubular stem 4, which is preferably arranged angularly to the center line of the head 1, so as to adapt the sections to a loop formed by the flexible hose to which the sections are connected. The head 1 is preferably made in cylindrical form with its outer end closed by a plate 5, which is integral with said head, its inner end being partially closed by an annular flange 6, whereby a central opening 7 is formed. Said opening is circular, with its outer end enlarged by a counterbore 8, and its inner portion being provided with a screw-thread 9 for receiving the corresponding end of a sleeve B, which screws thereinto. The head 1 is provided at the side opposite to the passage 3 with a segmental flange 10, which is preferably formed at a slight angle in respect to the plane of the inner end of said head, and said flange is curved toward the closed end of the head 1, so as to form an engaging rim 11, which will enter a groove of another flange formed on the head of the section which connects to the section now described. A second segmental flange 12 (which is the flange last above referred to) is formed diametrically opposite to the flange 10 and extends inwardly to overlap the inner end of the head 1, and is provided with a groove 13 to receive the engaging rim 11 of a connecting-section, as shown in Fig. 2. The outer end of the flange 12 is slightly beveled or rounded, as at 14, to facilitate the engagement of the flange 10 therewith, and the opposite end of the flange 12 is provided with a stop or lug 15 to prevent the conjoining flange from being moved too far by the rotative movement by which the sections of my couplings are connected together.

C designates an annular gasket of rubber or other suitable material, which is inserted in the enlarged outer end of the opening 7. Said gasket is provided at the inner end of its bore with an inwardly-extending circumferential flange 16, which engages with an outwardly-extending circumferential flange 17, formed on the outer end of the sleeve B, so as to prevent said gasket from being forced too far out of the opening 7. The annular rim 18 of the gasket C projects beyond the plane of the inner end of the head 1 and the outer face of the flange 17, so that when two sections are placed together preparatory to the operation of connecting them together the faces of the annular rims of the two gaskets will bear against each other.

D designates a spring, which is inserted in the enlarged portion of the opening 7, so as to bear against the shoulder 19 and the inner face of the gasket C for the purpose of forcing the latter outwardly until the flanges 16 and 17 are brought in contact with each other to prevent a further outward movement of the gasket. When preferred, the sleeve B may be provided with a series of openings 20, which lead from the bore of said sleeve into the space behind the gasket C, so as to allow steam to enter said space and, as an auxiliary to the spring D, aid in forcing the gasket outwardly. When the steam-pressure is utilized to aid said spring, the latter can be made of just sufficient strength to carry the weight of the gasket, the steam-pressure being sufficient to hold the two gaskets in close contact with each other. The sleeve B is provided with notches 21 or other provision for receiving a tool or driver for screwing said sleeve into and out of the opening 7.

The two sections of my coupling are connected together in the following manner: The sections are placed with their inner faces toward each other, so that the projecting rim of the gaskets C will bear face to face. Then by giving either one or both of the sections a partial revolution in the direction indicated by the arrow on Fig. 4 the circumferential flanges 16 and 17 will become engaged to draw the adjacent faces of said sections toward each other, the rims of the two gaskets C being in close contact with each other to form a steam-tight joint. To disconnect the sections from each other, either one or both of said sections should be partially rotated in a direction reversed, (shown by the arrow on Fig. 4,) and the two sections may then be separated. If by accident or design two cars become separated, the unusual strain thrown upon my couplings will cause the two sections to be drawn apart in a longitudinal direction, and under such conditions the gaskets C will be forced inwardly to allow the rims 11 to be drawn out of the grooves 13 without damage to the flexible hose by which my couplings are connected to the steam-heating system of a car. Preferably the gaskets B are made of material which, while it possesses a certain degree of elasticity, will not become sticky by use, so as to impede a free reciprocating movement of said gaskets in the openings 7, and I find by experience that a material known in the market as the "Rainbow packing" possesses the qualities essential to a proper operation of said gaskets; but I do not confine myself to that material.

What I claim as my invention, and desire to secure by Letters Patent, is—

1. A coupling for flexible steam-pipes, the same consisting of two like sections fitted to interlock and having a longitudinal joint between them, each of said sections comprising a chambered head having a tubular neck leading laterally therefrom, a central opening formed in the inner face of said head and having the outer end of its bore enlarged, a sleeve provided with an outer circumferential flange and secured in said opening, so as to form an annular chamber therein, an annular gasket fitted to move reciprocally in said chamber and provided with an inner circumferential flange fitted to engage with the flange of said sleeve, and a spring interposed between the inner face of said gasket and the bottom of said annular chamber, as and for the purpose herein specified.

2. In a coupling for flexible steam-pipes, the combination of a hollow head having a central opening whose outer end is enlarged in diameter, a sleeve provided with an outer circumferential flange and fitted to secure in said central opening, so as to form an annular chamber in the latter, said sleeve having a series of steam-openings forming communications from the bore of said sleeve and the annular chamber, an annular gasket fitted to reciprocate in said annular chamber and having an inner circumferential flange that is fitted to engage with the flange of said sleeve, and a spring interposed between said gasket and the bottom of said annular chamber, as and for the purpose herein specified.

JAMES E. MARBLE.

Witnesses:
C. A. FULLER,
WM. H. LOW.